United States Patent
Putt et al.

(10) Patent No.: US 7,093,879 B2
(45) Date of Patent: Aug. 22, 2006

(54) LOAD BEARING VEHICLE FLOOR MATS

(75) Inventors: Maureen R. Putt, Canton, OH (US); Michael C. Jezewski, East Sparta, OH (US); Steven G. Sehmer, Uniontown, OH (US)

(73) Assignee: Collins & Aikman Products Co., Troy, MI (US)

( * ) Notice: Subject to any disclaimer, the term of this patent is extended or adjusted under 35 U.S.C. 154(b) by 0 days.

(21) Appl. No.: 10/797,775

(22) Filed: Mar. 10, 2004

(65) Prior Publication Data

US 2004/0241384 A1 Dec. 2, 2004

Related U.S. Application Data

(60) Provisional application No. 60/455,994, filed on Mar. 19, 2003.

(51) Int. Cl.
B62D 25/20 (2006.01)

(52) U.S. Cl. .............................. 296/97.23; 296/37.14; 224/42.2

(58) Field of Classification Search .............. 296/97.23, 296/39.1, 37.1, 37.16, 37.14; 52/177; 428/95; 224/42.12, 42.2
See application file for complete search history.

(56) References Cited

U.S. PATENT DOCUMENTS

| | | | | |
|---|---|---|---|---|
| 3,669,817 A | * | 6/1972 | McDevitt | 428/82 |
| 4,399,176 A | | 8/1983 | Bell et al. | 428/85 |
| 4,423,900 A | * | 1/1984 | Sugimoto et al. | 296/37.14 |
| 4,465,720 A | | 8/1984 | Bell et al. | 428/85 |
| 4,801,169 A | | 1/1989 | Queen et al. | 296/39.1 |
| 4,848,826 A | | 7/1989 | Kuwabara et al. | 296/97.23 |
| RE33,200 E | | 4/1990 | Reynolds et al. | 296/39.1 |
| 5,178,434 A | * | 1/1993 | Krebs | 296/37.3 |
| 5,238,284 A | | 8/1993 | Whitaker | 296/37.16 |
| 5,842,730 A | | 12/1998 | Schneider et al. | 296/37.3 |
| 5,979,962 A | | 11/1999 | Valentin et al. | 296/37.1 |
| 6,017,074 A | * | 1/2000 | Biskup | 296/39.1 |
| 6,102,464 A | | 8/2000 | Schneider et al. | 296/37.3 |
| 6,247,741 B1 | * | 6/2001 | Seel et al. | 296/37.14 |
| 6,290,278 B1 | | 9/2001 | Loveland | 296/39.1 |
| 6,406,085 B1 | | 6/2002 | Stanesic | 296/97.23 |
| 6,467,829 B1 | * | 10/2002 | Kaluszka et al. | 296/37.3 |
| 6,502,886 B1 | * | 1/2003 | Bleau et al. | 296/37.3 |
| 6,644,709 B1 | * | 11/2003 | Inagaki et al. | 296/37.16 |
| 6,719,348 B1 | * | 4/2004 | Song | 296/39.1 |
| 2001/0040382 A1 | * | 11/2001 | Nemoto | 296/37.14 |

FOREIGN PATENT DOCUMENTS

JP 61249850 A * 11/1986

* cited by examiner

*Primary Examiner*—Lori L. Coletta
(74) *Attorney, Agent, or Firm*—Myers Bigel Sibley & Sajovec

(57) ABSTRACT

A load bearing floor mat for vehicle cargo compartments includes a pliable layer configured to overlie a defined area of a vehicle floor and also includes a rigid member that is associated with a portion of the pliable layer. The rigid member has a width that is sufficient to span a gap or opening in the vehicle floor, such as a spare tire well or other storage compartment. The rigid member renders the pliable layer substantially non-pliable above the opening such that the floor mat can support a load placed thereon.

39 Claims, 7 Drawing Sheets

LOAD BEARING VEHICLE FLOOR MATS

RELATED APPLICATION

This application claims the benefit of U.S. Provisional Application No. 60/455,994 filed Mar. 19, 2003, the disclosure of which is incorporated herein by reference in its entirety as if set forth fully herein.

FIELD OF THE INVENTION

The present invention relates generally to vehicles and, more particularly, to vehicle floor mats.

BACKGROUND OF THE INVENTION

Motor vehicles are typically provided with a cargo storage compartment of some type. For example, sedan-style automobiles are conventionally equipped with a trunk. Sport/utility and mini-van vehicles are conventionally provided with a cargo storage area behind the last row of seating.

Vehicle cargo compartments often include a rigid, load bearing floor panel that overlies a spare tire compartment or other cavity in a floor thereof. A carpet conventionally overlies such a floor panel. Access to an area beneath the floor panel usually is provided by first removing the carpet and then removing the floor panel. For example, U.S. Pat. No. 5,842,730 to Schneider et al. describes a spare tire storage compartment cover that has at least two sections joined by a living hinge. When the cover is in place over the spare tire storage compartment, it is held in place by a conventional tie-down mechanism that secures the first section in place. The second section, located toward the rear of the vehicle when the cover is in place, can be rotated relative to the first section to allow access to the spare tire storage compartment. The first and second sections are formed from wood and a carpet is secured to both sections via clips.

Vehicle manufacturers are constantly seeking load bearing components that are lighter in weight, that have increased strength, and that are inexpensive to manufacture. As such, there is a continuing need for improved load-bearing panels for vehicle cargo compartments.

SUMMARY OF THE INVENTION

In view of the above discussion, load bearing floor mats for vehicle cargo compartments are provided that eliminate the need for separate load supporting members. According to embodiments of the present invention, a vehicle floor mat includes a pliable layer that is configured to overlie a defined area of a vehicle floor and also includes a rigid member that is integrally attached to a portion of the pliable layer. The rigid member has a width that is sufficient to span a gap or opening (e.g., a spare tire well or other storage compartment, gaps between collapsed seats, etc.) in the vehicle floor. The rigid member renders the pliable layer substantially non-pliable above the opening such that the floor mat can support a load placed thereon.

According to other embodiments of the present invention, a rigid member, disposed within or attached to a vehicle floor mat pliable layer, includes a plurality of spaced-apart apertures formed therethrough. The apertures may be formed in an array and are configured to reduce the weight of the rigid member.

According to other embodiments of the present invention, a vehicle floor mat includes a first pliable layer configured to overlie an area of a vehicle floor and a second pliable layer that is pivotally secured to the first pliable layer and movable between a stored position overlying the first pliable layer in face-to-face relationship therewith and an operative position substantially coplanar with the first pliable layer. First and second rigid members are disposed within the first and second pliable layers, respectively. The rigid members each have a width sufficient to span a recessed portion in the vehicle floor area such that the respective first and second pliable layers are rendered substantially non-pliable above the recessed portion, and such that the floor mat can support a load placed thereon above the recessed portion.

According to other embodiments of the present invention, a vehicle floor mat includes a pliable layer configured to overlie an area of a vehicle floor and a plurality of adjacent, spaced-apart rigid members disposed within the pliable layer. Each rigid member has a width sufficient to span a recessed portion in the vehicle floor area such that the pliable layer is rendered substantially non-pliable above the recessed portion, and such that the floor mat can support a load placed thereon above the recessed portion.

Vehicle floor mats, according to embodiments of the present invention, have a look and feel similar to that of conventional floor mats. Moreover, vehicle floor mats, according to embodiments of the present invention, are sufficiently light-weight and can be manipulated easily. By eliminating the need for separate load supporting members, vehicle floor mats, according to embodiments of the present invention, can enhance the aesthetic appeal of a vehicle interior and can help reduce vehicle manufacturing costs.

DETAILED DESCRIPTION OF THE INVENTION

Figure 1:
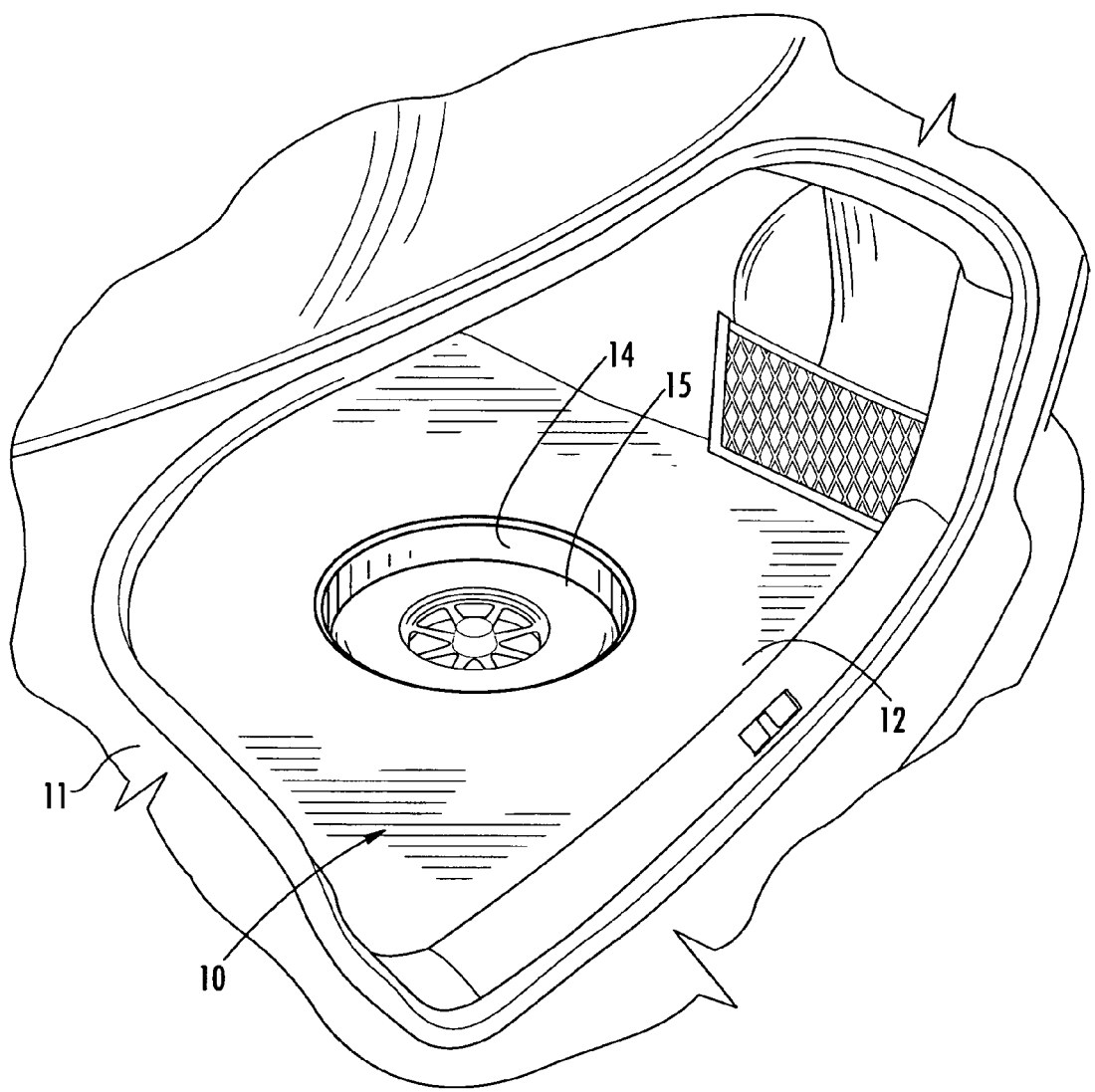
FIG. 1 is a perspective view of a vehicle cargo compartment illustrating a spare tire well therein.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the drawings, the thickness of lines, layers and regions may be exaggerated for clarity. It will be understood that when an element is referred to as being "on" another element, it can be directly on the other element or intervening elements may also be present. In contrast, when an element is referred to as being "directly on" another element, there are no intervening elements present. It will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present. The terms "upwardly", "downwardly", "vertical", "horizontal" and the like are used herein for the purpose of explanation only.

As used herein, the term "and/or" includes any and all combinations of one or more of the associated listed items.

Referring to FIG. 1, a cargo compartment (e.g., a trunk) 10 of a vehicle 11 is illustrated. The cargo compartment 10 includes a floor 12 having a recessed portion 14 formed therein and which serves as a storage compartment for a spare tire 15. A layer of carpet or other covering may be affixed to the vehicle floor 12 in conventional fashion.

As used herein, the term "recessed portion" includes any gap, opening, recess over which it is desired to be able to support loads via a mat. Embodiments of the present invention are not limited to mats that overlie spare tire storage compartments.

Figure 2:
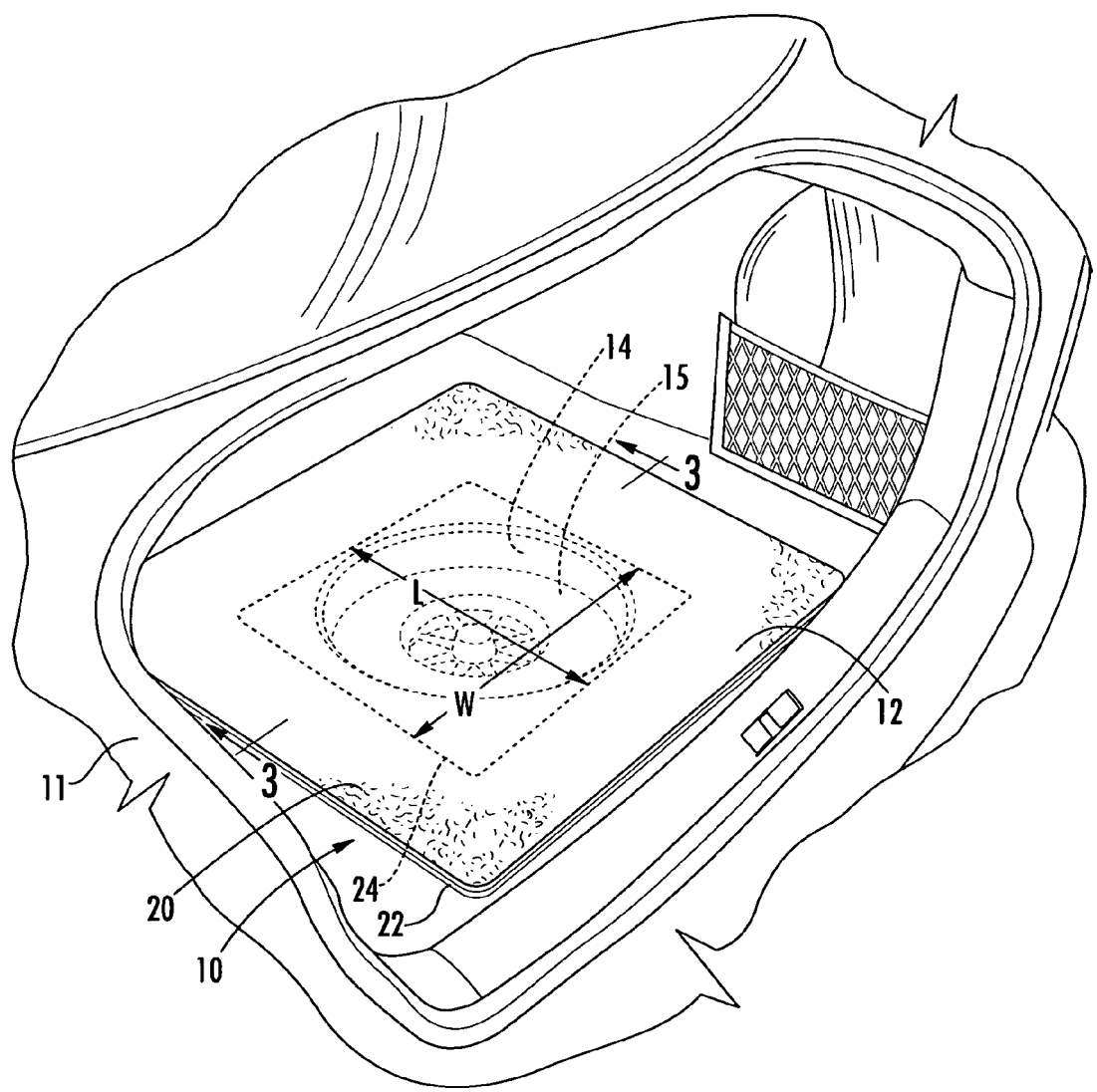
FIG. 2 is a perspective view of a load bearing floor mat according to embodiments of the present invention disposed within the cargo compartment of FIG. 1.

Referring to FIG. 2, a vehicle floor mat 20, according to embodiments of the present invention, is illustrated in an installed configuration within the cargo compartment 10 of FIG. 1. The floor mat 20 includes a pliable layer 22 that is configured to overlie a defined area of the floor 12, as illustrated. The illustrated floor mat 20 also includes a rigid member 24 that is disposed within the pliable layer 22.

In the illustrated embodiment, the rigid member 24 has a width W that is sufficient to span the recessed spare tire storage compartment 14. In the illustrated embodiment, the rigid member 24 also has a length L that is sufficient to span the recessed spare tire storage compartment 14. However, embodiments of the present invention are not limited to rigid members that entirely overlie a recessed portion. Rigid members need only span a recessed portion in at least one direction in order to be capable of supporting loads placed thereon.

Figure 3:
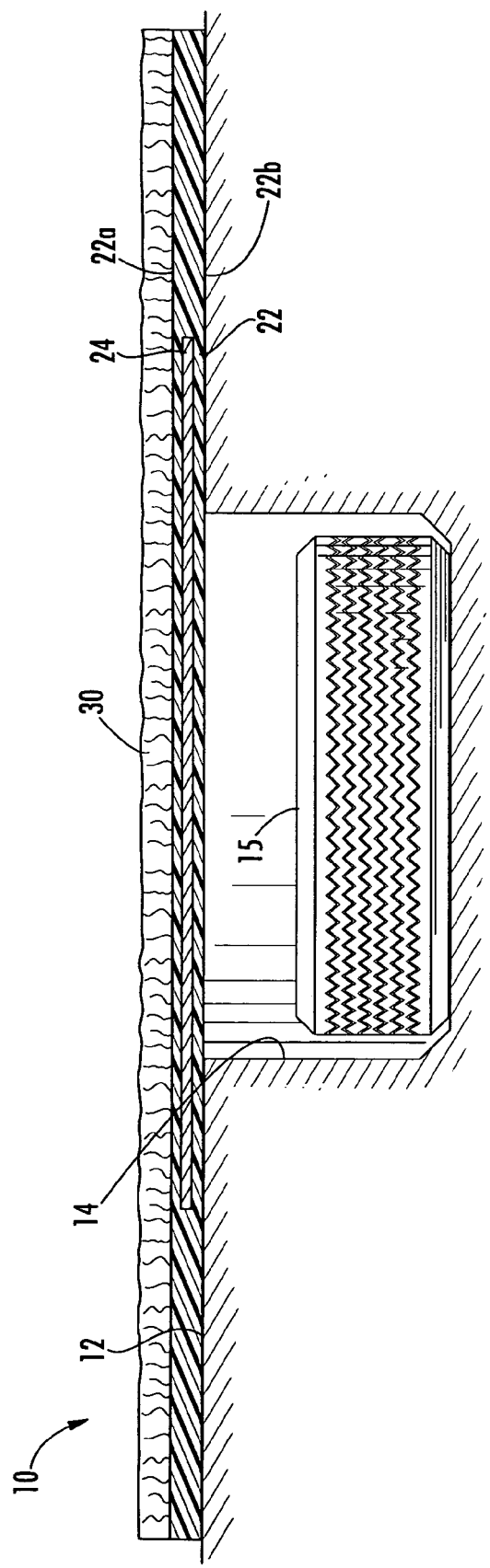
FIG. 3 is a section view of the floor mat and cargo compartment of FIG. 2 taken along lines 3—3.

The rigid member 24 renders the pliable layer 22 substantially non-pliable above the recessed storage compartment 14 such that the floor mat can support a load placed thereon. FIG. 3 illustrates the floor mat 20 positioned on the vehicle floor 12 with the rigid member 24 spanning the recessed spare tire storage compartment 14. In the illustrated embodiment, the pliable layer 22 includes opposite first and second surfaces 22a, 22b, and the rigid member 24 is disposed within the pliable layer 22 between the first and second surfaces 22a, 22b. According to other embodiments of the present invention, the rigid member 24 may be partially disposed within the pliable layer 24 (i.e., one or more portions of the rigid member 24 may be exposed at either or both of the pliable layer first and second surfaces 22a, 22b). According to other embodiments of the present invention, the rigid member 24 may be attached (e.g., adhesively attached, thermally bonded, etc.) to either of the pliable layer first or second surfaces 22a, 22b.

The present invention eliminates the need for a separate load supporting member, independent of the floor mat 20. According to embodiments of the present invention, rigid member 24 is configured to allow the floor mat 20 to support a load without causing the floor mat 20 to buckle under the weight of the load. Rigid member 24 may be designed to support loads having virtually any amount of weight placed thereon.

According to embodiments of the present invention, the rigid member may be formed from virtually any type of material including, but not limited to, thermosetting and thermoplastic polymers, glass reinforced polymers (e.g., thermoset rubber, polypropylene, etc.) wood, metals, etc. According to embodiments of the present invention, the pliable layer may be virtually any type of natural or synthetic polymer (or a combination of natural and synthetic polymers. An exemplary material includes, but is not limited to, rubber.

According to embodiments of the present invention, carpeting 30 (or other trim material) may be disposed on the pliable layer first surface 22a, as illustrated in FIG. 3.

Figure 4:
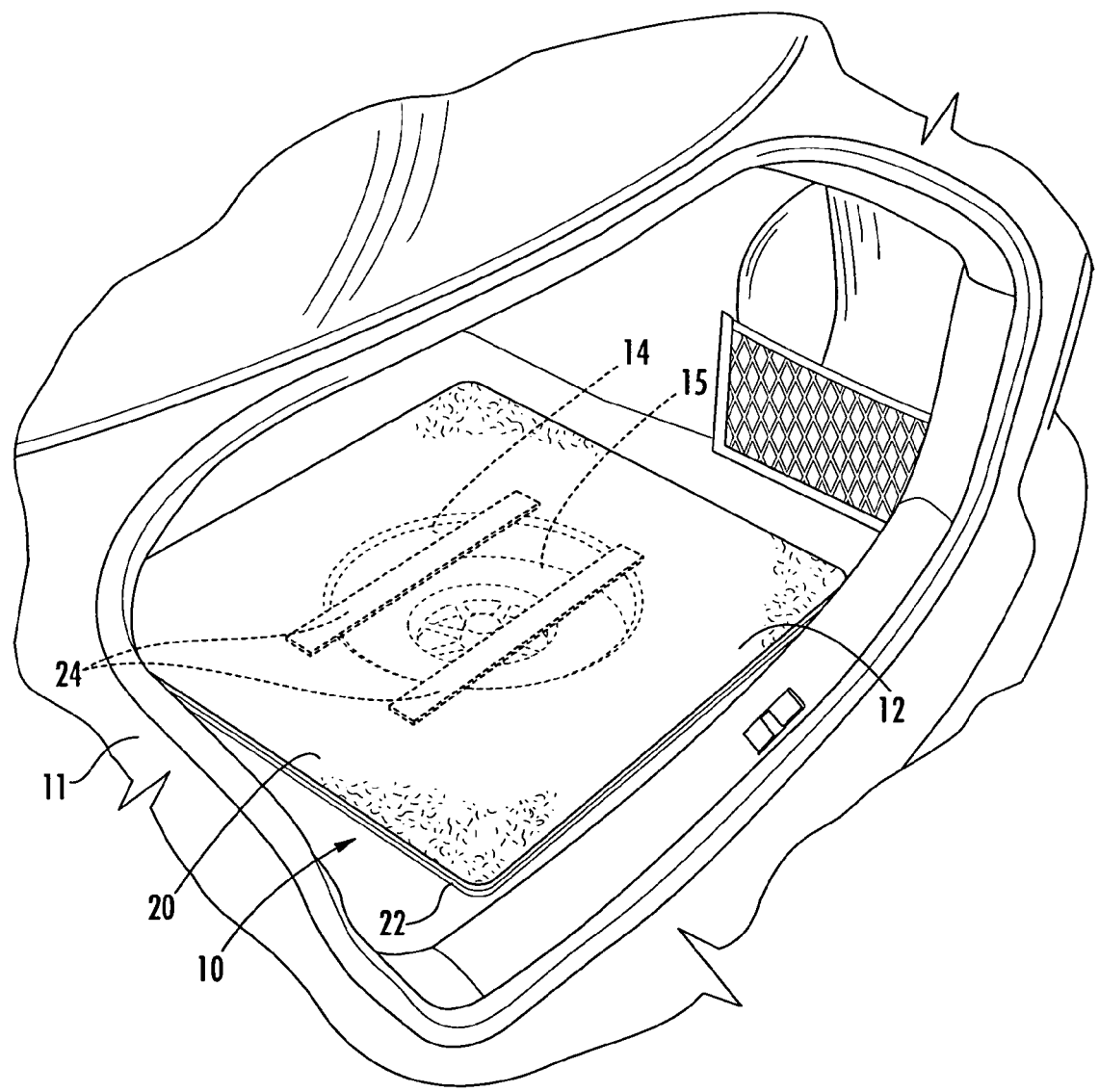
FIG. 4 is a perspective view of a load bearing floor mat having multiple rigid members, according to embodiments of the present invention.

According to other embodiments of the present invention, a plurality of rigid members 24 may be utilized, as illustrated in FIG. 4. These rigid members 24 may be entirely or partially disposed within the pliable layer 22 in adjacent, spaced-apart relationship. Alternatively, a plurality of rigid members 24 may be integrally attached to either of the pliable layer first and second surfaces 22a, 22b in adjacent spaced-apart relationship.

Figure 5:
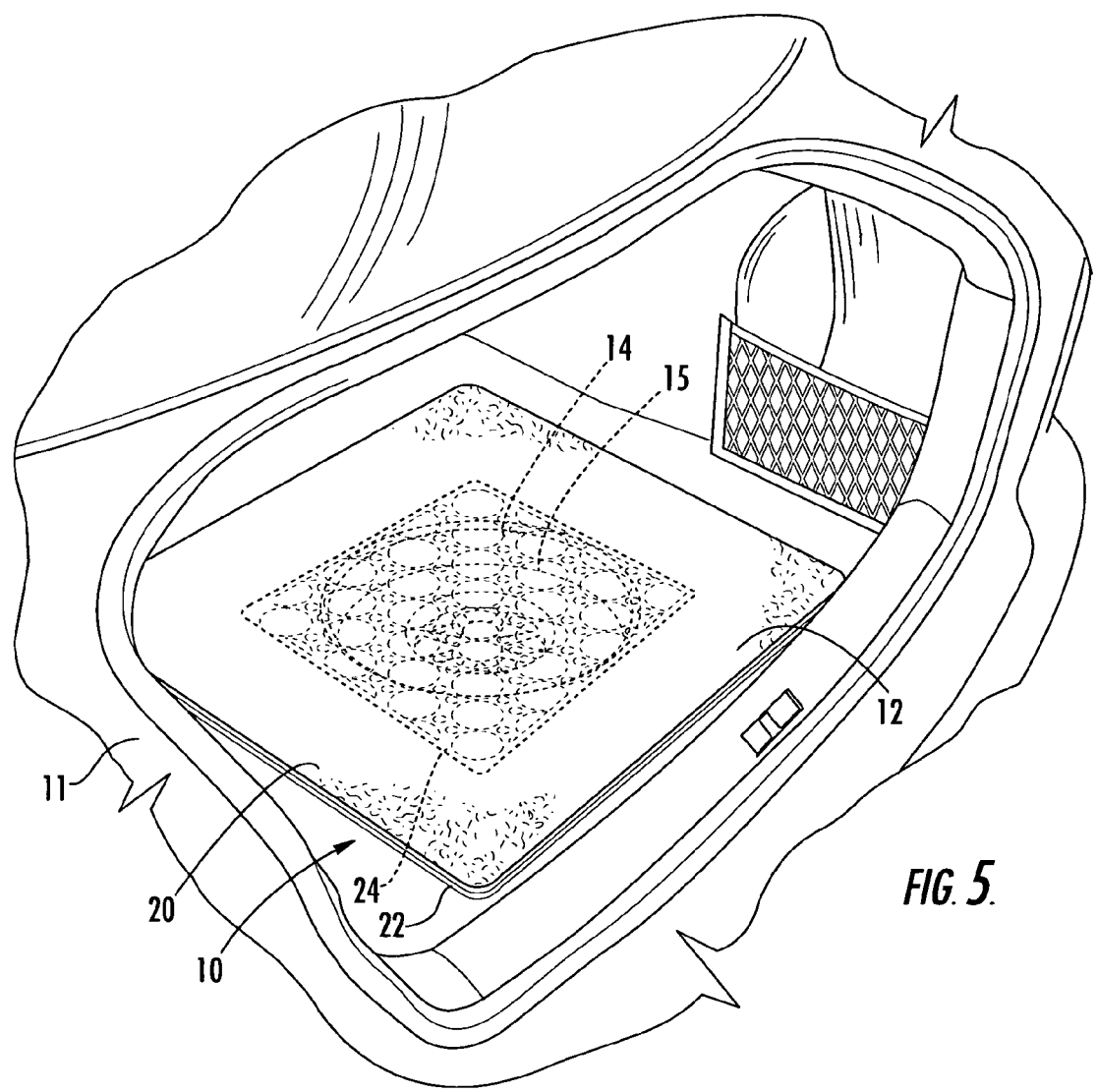
FIG. 5 is a perspective view of a load bearing floor mat having weight-reducing apertures formed in the rigid member, according to embodiments of the present invention.
Figure 5A:
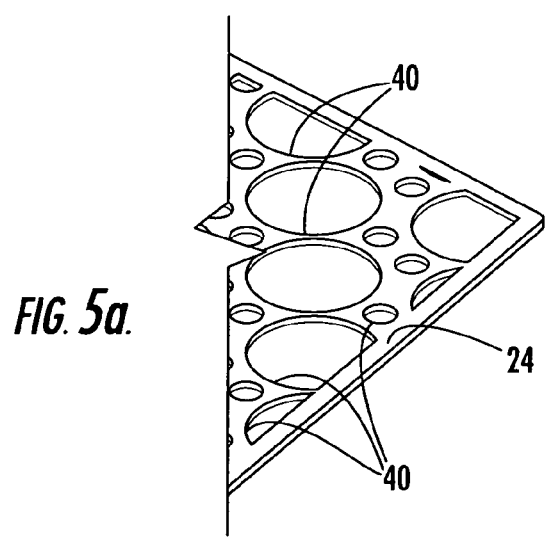
FIG. 5A is an enlarged, partial view of a portion of the rigid member of FIG. 5.

In order, to reduce weight of the floor mat 20, the rigid member 24 (or one or more rigid members if a plurality) may include a plurality of spaced-apart apertures 40 formed therethrough as illustrated in FIGS. 5–5A. The apertures 40 may have any shape and size, and may be arranged in virtually any pattern or array. Embodiments of the present invention are not limited to the illustrated pattern, sizes and shapes of apertures 40.

The pliable layer 22 as illustrated in FIGS. 2–5 may have various shapes and sizes. Moreover, the pliable layer 22 may have various thicknesses, including variable thicknesses throughout its cross-section.

Figure 6:
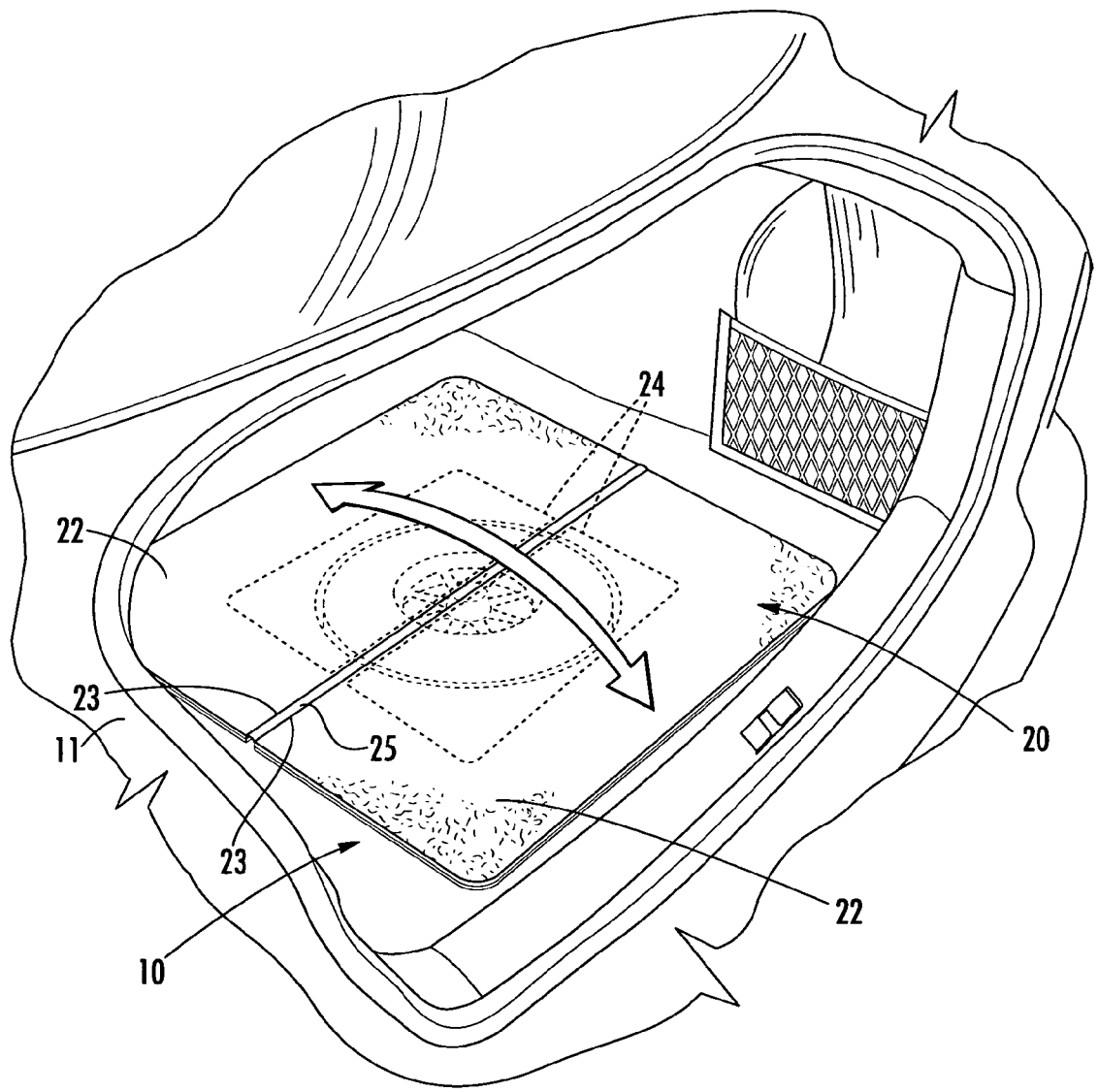
FIG. 6 is a perspective view of a load bearing floor mat having two portions pivotally secured together, according to embodiments of the present invention.
Figure 7:
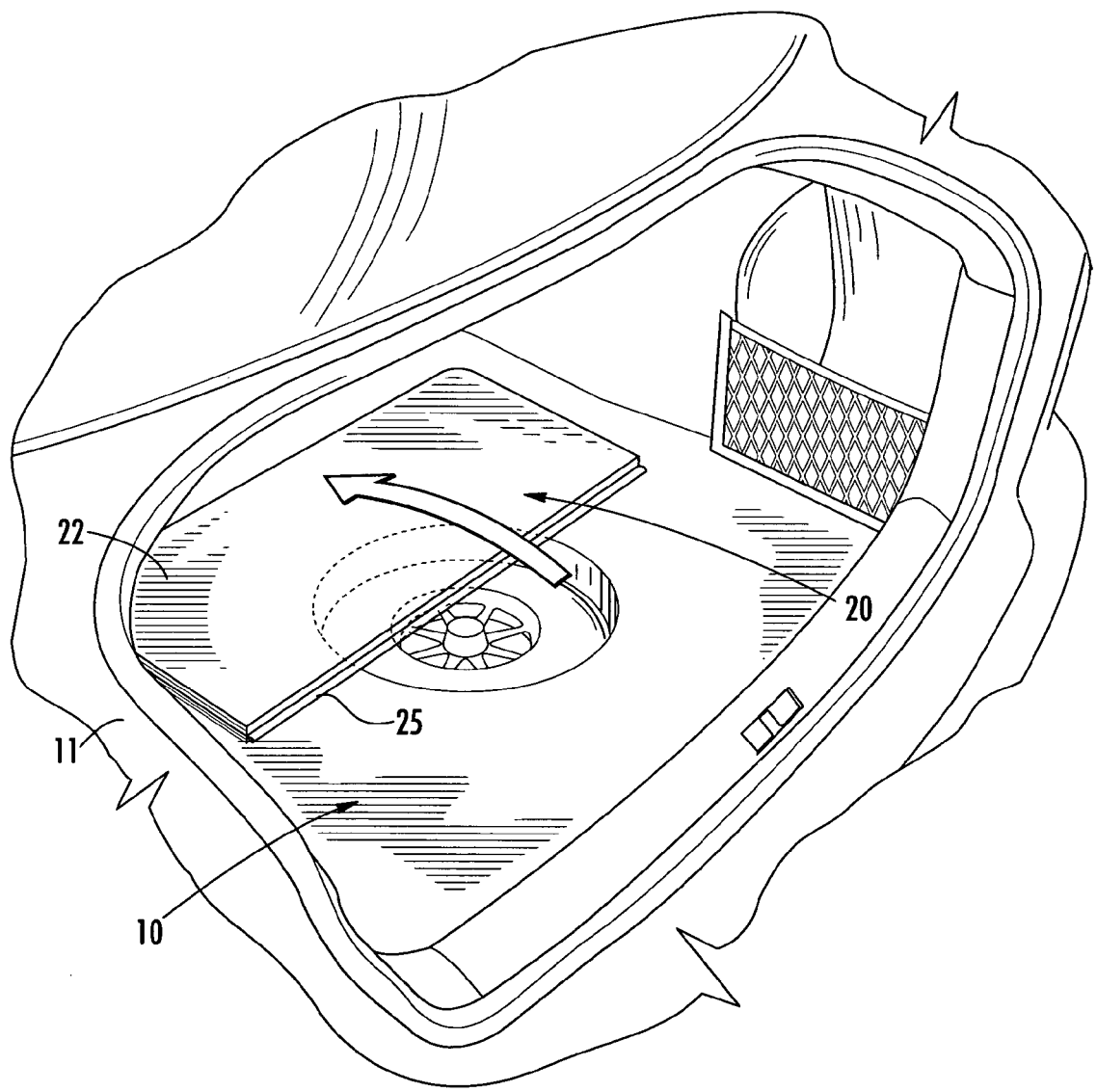
FIG. 7 is a perspective view of the load bearing floor mat of FIG. 6 illustrating the two portions in overlying, face-to-face relationship.

Referring now to FIG. 6, a vehicle floor mat 20 having two pliable layers 22 pivotally secured together is illustrated. The two pliable layers 22 are pivotally attached along respective peripheral edge portions 23 via hinge 25. Hinge 25 may be any type of hinge. For example, the overlying carpeting 30 may serve the function of a hinge. Alternatively, a separate hinge, such as a piano hinge, may be utilized. The two illustrated pliable layers 22 are movable relative to one another between a stored position in overlying, face-to-face relationship (FIG. 7) and an operative position substantially coplanar with each other (FIG. 6). The two pliable layers 22 each include one or more rigid members integrally attached thereto or disposed therewithin as described above.

In use, load bearing vehicle floor mats according to embodiments of the present invention may be used in any place with a recessed portion or gap that needs to be bridged so as to support a load. Floor mats according to embodiments of the present invention eliminate the need for a separate spare tire cover with an overlying accessory mat in the trunk of an automobile. Vehicle floor mats according to embodiments of the present invention are advantageous because they can be placed over collapsed seats (e.g., the collapsed second row seats of a minivan) so as to support cargo and other loads placed over a gap between the collapsed seats.

Vehicle floor mats according to embodiments of the present invention have the look and feel of conventional That which is claimed is:

1. A vehicle floor mat, comprising:
   a pliable layer configured to overlie an area of a vehicle floor; and
   a rigid member attached to a portion of the pliable layer, wherein the rigid member has a width less than a width and length of the pliable layer, but sufficient to span a recessed portion in the vehicle floor area such that the pliable layer is rendered substantially non-pliable above the recessed portion, and such tat the floor mat is self-supporting and can independently support a load placed thereon above the recessed portion, without any external support from within the recessed portion.

2. The vehicle floor mat of claim 1, wherein the rigid member is at least partially disposed within the pliable layer.

3. The vehicle floor mat of claim 1, wherein the rigid member comprises material selected from the group consisting of thermoplastic and thermosetting polymers, glass reinforced thermoset rubber, glass reinforced polypropylene, wood, and metal.

4. The vehicle floor mat of claim 1, wherein the pliable layer comprises material selected from the group consisting of natural and synthetic polymers.

5. The vehicle floor mat of claim 1, wherein the pliable layer comprises rubber.

6. The vehicle floor mat of claim 1, wherein the pliable layer has opposite first and second surfaces, and wherein carpeting is disposed on the pliable layer first surface.

7. The vehicle floor mat of claim 1, wherein the rigid member comprises a plurality of spaced-apart apertures formed therethrough.

8. The vehicle floor mat of claim 1, further comprising a second pliable layer pivotally secured to a peripheral edge portion of the pliable layer, wherein the second pliable layer is movable between a stored position overlying the pliable layer in face-to-face relationship therewith and an operative position substantially coplanar with the pliable layer.

9. The vehicle floor mat of claim 8, wherein a second rigid member is attached to the second pliable layer, and wherein the second rigid member has a width less than a width and length of the second pliable layer, but configured to span a second recessed portion in the vehicle floor area such that the floor mat is self-supporting and can independently support a load placed thereon above the second recessed portion, without any external support from within the second recessed portion.

10. The vehicle floor mat of claim 9, wherein the second rigid member is at least partially disposed within the second pliable layer.

11. The vehicle floor mat of claim 9, wherein the second rigid member comprises material selected from the group consisting of thermoplastic and thermosetting polymers, glass reinforced thermoset rubber, glass reinforced polypropylene, wood, and metal.

12. The vehicle floor mat of claim 9, wherein the second pliable layer comprises material selected from the group consisting of natural and synthetic polymers.

13. The vehicle floor mat of claim 8, wherein the second pliable layer comprises rubber.

14. The vehicle floor mat of claim 8, wherein the second pliable layer has opposite first and second surfaces, and wherein carpeting is disposed on the second flexible member first surface.

15. The vehicle floor mat of claim 9, wherein the second rigid member comprises a plurality of spaced-apart apertures formed therethrough.

16. The vehicle floor mat of claim 8, wherein the second pliable layer is pivotally secured to the peripheral edge via a hinge.

17. The vehicle floor mat of claim 16, wherein the hinge comprises carpeting disposed on the first and second pliable layers.

18. A vehicle floor mat, comprising:
   a pliable layer configured to overlie an area of a vehicle floor; and
   a rigid member disposed within the pliable layer, wherein the rigid member comprises a plurality of spaced-apart apertures formed therethrough, wherein the rigid member has a width less than a width and length of the pliable layer, but sufficient to span a recessed portion in the vehicle floor area such that the pliable layer is rendered substantially non-pliable above the recessed portion, and such that the floor mat is self-supporting and can independently support a load placed thereon above the recessed portion, without any external support from within the recessed portion.

19. The vehicle floor mat of claim 18, wherein the rigid member comprises material selected from the group consisting of thermoplastic and thermosetting polymers, glass reinforced thermoset rubber, glass reinforced polypropylene, wood, and metal.

20. The vehicle floor mat of claim 18, wherein the pliable layer comprises material selected from the group consisting of natural and synthetic polymers.

21. The vehicle floor mat of claim 18, wherein the pliable layer comprises rubber.

22. The vehicle floor mat of Claim 18, wherein the pliable layer has opposite first and second surfaces, and wherein carpeting is disposed on the pliable layer first surface.

23. A vehicle floor mat, comprising:
   a first pliable layer configured to overlie an area of a vehicle floor;
   a second pliable layer pivotally secured to the first pliable layer and movable between a stored position overlying the first pliable layer in face-to-face relationship therewith and an operative position substantially coplanar with the first pliable layer;
   a first rigid member disposed within the first pliable layer; and
   a second rigid member disposed within the second pliable layer;
   wherein the first and second rigid members each have a width less than a width and length of the first and second pliable layers, but sufficient to span a recessed portion in the vehicle floor area such that the respective first and second pliable layers are rendered substantially non-pliable above the recessed portion, and such that the floor mat is self-supporting and can independently support a load placed thereon above the recessed portion, without any external support from within the recessed portion.

24. The vehicle floor mat of claim 23, wherein the first and second rigid members each comprise material selected from the group consisting of thermoplastic and therinosetting polymers, glass reinforced thermoset rubber, glass reinforced polypropylene, wood, and metal.

25. The vehicle floor mat of claim 23, wherein the first and second pliable layers each comprise material selected from the group consisting of natural and synthetic polymers.

26. The vehicle floor mat of claim 23, wherein the first and second pliable layers each comprise rubber.

27. The vehicle floor mat of claim 23, wherein the first and second pliable layers each have opposite first and second surfaces, and wherein carpeting is disposed on the each pliable layer first surface.

28. The vehicle floor mat of claim 23, wherein the first and second rigid members each comprise a plurality of spaced-apart apertures formed therethrough.

29. A vehicle floor mat, comprising:
a pliable layer configured to overlie an area of a vehicle floor; and
a plurality of adjacent, spaced-apart rigid members attached to the pliable layer, wherein each rigid member has a width less than a width and length of the pliable layer, but sufficient to span a recessed portion in the vehicle floor area such that the pliable layer is rendered substantially non-pliable above the recessed portion, and such that the floor mat is self-supporting and can independently support a load placed thereon above the recessed portion, without any external support from within the recessed portion.

30. The vehicle floor mat of claim 29, wherein the rigid members are at least partially disposed within the pliable layer.

31. The vehicle floor mat of claim 29, wherein each rigid member comprises material selected from the group consisting of thermoplastic and thermosetting polymers, glass reinforced thermoset rubber, glass reinforced polypropylene, wood, and metal.

32. The vehicle floor mat of claim 29, wherein each pliable layer comprises material selected from the group consisting of natural and synthetic polymers.

33. The vehicle floor mat of claim 29, wherein the pliable layer comprises rubber.

34. The vehicle floor mat of claim 29, wherein the pliable layer has opposite first and second surfaces, and wherein carpeting is disposed on the pliable layer first surface.

35. The vehicle floor mat of claim 29, wherein each rigid member comprises a plurality of spaced-apart apertures formed therethrough.

36. A vehicle, comprising:
a floor having a recessed porton; and
a floor mat overlying the recessed portion in the vehicle floor, wherein the floor mat comprises:
a pliable layer; and
a rigid member attached to a portion of the pliable layer, wherein the rigid member has a width less than a width and length of the pliable layer, but sufficient to span the recessed portion such that the pliable layer is rendered substantially non-pliable above the recessed portion, and such that the floor mat is self-supporting and can independently support a load placed thereon above the recessed portion, without any external support from within the recessed portion.

37. A vehicle, comprising:
a floor having a recessed portion; and
a floor mat overlying the recessed portion in the vehicle floor, wherein the floor mat comprises:
a pliable layer; and
a rigid member disposed within the pliable layer, wherein the rigid member comprises a plurality of spaced-apart apertures formed therethrough, wherein the rigid member has a width less than a width and length of the pliable layer, but sufficient to span the recessed portion such that the pliable layer is rendered substantially non-pliable above the recessed portion, and such that the floor mat is self-supporting and can independently support a load placed thereon above the recessed portion, without any external support from within the recessed portion.

38. A vehicle, comprising:
a floor having a recessed portion; and
a floor mat overlying the recessed portion in the vehicle floor, wherein the floor mat comprises:
a first pliable layer;
a second pliable layer pivotally secured to the first pliable layer and movable between a stored position overlying the first pliable layer in face-to-face relationship therewith and an operative position substantially coplanar with the first pliable layer;
a first rigid member disposed within the first pliable layer; and
a second rigid member disposed within the second pliable layer;
wherein the first and second rigid members each have a width less than a width and length of the first and second pliable layers, but sufficient to span the recessed portion such that the respective first and second pliable layers are rendered substantially non-pliable above the recessed portion, and such that the floor mat is self-supporting and can independently support a load placed thereon above the recessed portion, without any external support from within the recessed portion.

39. A vehicle, comprising:
a floor having a recessed portion; and
a floor mat overlying the recessed portion in the vehicle floor, wherein the floor mat comprises:
a pliable layer; and
a plurality of adjacent, spaced-apart rigid members attached to the pliable layer, wherein each rigid member has a width less than a width and length of the first and second pliable layer, but sufficient to span the recessed portion such that the pliable layer is rendered substantially non-pliable above the recessed portion, and such tat the floor mat is self-supporting and can independently support a load placed thereon above the recessed portion, without any external support from within the recessed portion.

* * * * *

UNITED STATES PATENT AND TRADEMARK OFFICE
CERTIFICATE OF CORRECTION

PATENT NO. : 7,093,879 B2
APPLICATION NO. : 10/797775
DATED : August 22, 2006
INVENTOR(S) : Putt et al.

It is certified that error appears in the above-identified patent and that said Letters Patent is hereby corrected as shown below:

Column 5,
Line 25 should read -- above the recessed portion, and such that the floor mat --

Column 6,
Line 1 should read -- consisting of thermoplastic and thermosetting polymers, --

Column 7,
Lines 6 should read -- from the group consisting of thermoplastic and thermoset- --

Column 8,
Line 57 should read -- recessed portion, and such that the floor mat is self- --

Signed and Sealed this

Second Day of January, 2007

JON W. DUDAS
*Director of the United States Patent and Trademark Office*